Figure 1:
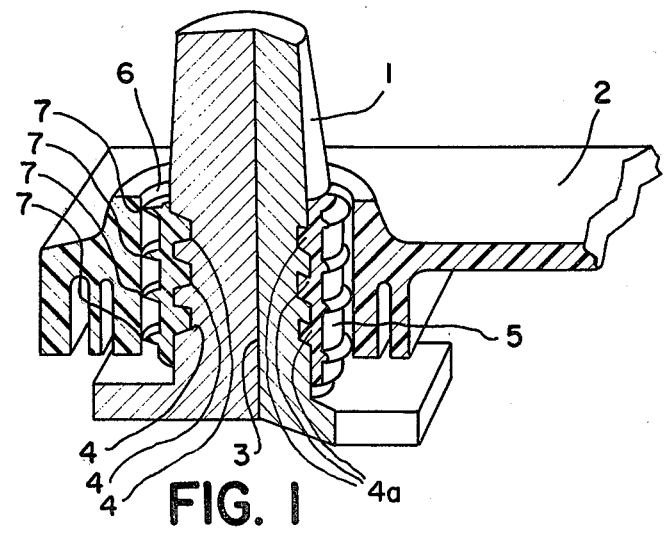

United States Patent [19]

Salamon

[11] 4,212,934

[45] Jul. 15, 1980

[54] POLE SEAL FOR STORAGE BATTERIES

[75] Inventor: Klaus Salamon, Kelkheim, Fed. Rep. of Germany

[73] Assignee: Varta Batterie Aktiengesellschaft, Hanover, Fed. Rep. of Germany

[21] Appl. No.: 949,749

[22] Filed: Oct. 10, 1978

[30] Foreign Application Priority Data

Dec. 23, 1977 [DE] Fed. Rep. of Germany ....... 2757568

[51] Int. Cl.² ............................................. H01M 2/02
[52] U.S. Cl. .................................................. 429/181
[58] Field of Search ................................. 429/180–185

[56] References Cited

U.S. PATENT DOCUMENTS

| 1,402,673 | 1/1922 | Skinner et al. ............... 429/182 X |
| 1,960,200 | 5/1934 | Beetem ................................ 429/183 |
| 2,637,758 | 5/1953 | Shannon ............................. 429/181 |
| 3,578,506 | 5/1971 | Chassoux .......................... 429/183 |
| 3,652,340 | 3/1972 | Sharpe et al. ..................... 429/184 |
| 3,678,178 | 7/1972 | Hubbauer et al. ............. 429/181 X |
| 3,957,539 | 5/1976 | Hayes, Jr. ........................... 429/185 |
| 4,127,707 | 11/1978 | Ohya et al. .................... 429/181 X |

Primary Examiner—Charles F. LeFevour
Attorney, Agent, or Firm—Weiser, Stapler & Spivak

[57] ABSTRACT

The battery pole extends through a tubular opening in the plastic battery lid. The pole shaft is surrounded by a synthetic plastic mantle which adjoins the tubular opening in frictionally sealing manner.

3 Claims, 2 Drawing Figures

POLE SEAL FOR STORAGE BATTERIES

The invention relates to an electrical storage battery with poles which are sealed through the housing lid.

In the manufacture of pole-lead throughs, particularly for starter batteries, lead boxes are inserted in the lid or molded into it and are welded to the pole head after assembly of the battery. However, it is also possible, without use of a box, to lead the pole directly through an opening in the lid and to unite the pole and lid firmly with each other by injecting plastic into the intervening gap.

The first method requires costly manufacturing operations. The second is complicated from the standpoint of production and does not always provide a reliable seal in the contact region between the lead pole and the plastic.

In addition, from German patent publication (Auslegungsschrift) No. 2,420,879, a pole lead-through is known in which sealing materials such a bitumen or cast resin surround the shaft of the pole and afford to it a certain amount of axial mobility relative to the lid. However, in this construction, reliable sealing of the lead pole also remains questionable.

Accordingly, it is an object of the invention to provide a pole lead-through through a block lid of synthetic plastic which is particularly suitable for convenient production, requires only low material costs, and in which the critical sealing region is as secure as possible against penetration by the battery acid.

This and other objects which will appear are achieved in accordance with the invention by leading the shaft of the pole through an opening in the housing lid in axially displaceably manner, and by sealing the shaft of the pole by means of a synthetic plastic mantle which is positioned adjacent the inner wall of the opening in frictionally sealing manner.

A significant aspect of the invention is that two similar synthetic plastic materials contact each other along the sealing region, but are not connected completely rigidly to each other. In order to insure a good seating fit of the terminal pole in the lid, the lead-through opening is in the shape of a tube. This also significantly increases the friction surface adjacent the shaft of the pole.

Figure 2:
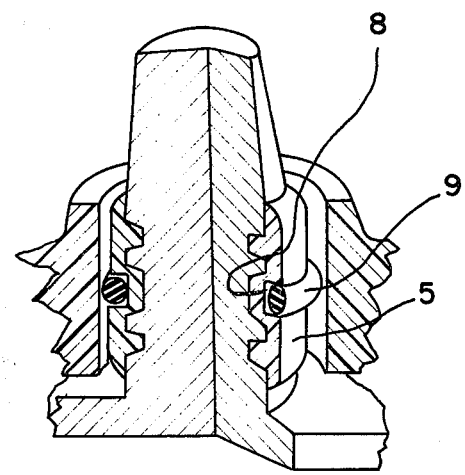

For further details, reference is made to the discussion which follows, in light of the accompanying drawing wherein FIG. 1 illustrates, in section, one embodiment of the invention, and FIG. 2 illustrates, also in section, another embodiment of the invention.

Referring to FIG. 1, this shows a lead pole 1, whose pole shaft 3 penetrating the lid 2 is provided with a labyrinth of encircling recesses or grooves 4. Upon this labyrinth the synthetic plastic mantle 5 is molded in the form of a sleeve shaped like a cylindrical tube having inwardly protruding ribs 4a which interlock with recesses 4. By means of sealing lips 7, which can be either immediately adjacent the synthetic plastic mantle 5, as shown, or else the inner wall of the tube, there is provided an effective seal for the pole lead-through, and particularly with a firm pass-through seat for the pole itself.

As shown in FIG. 2, the synthetic plastic mantle 5 may also be provided with one or more encircling recesses 8. Into these there is placed sealing string, or rather 0-rings, or sealing rings 9 which perform the function of the sealing lips.

Compared with known pole lead-throughs, the lead-through according to the invention has several advantages. Due to application of the synthetic plastic coating by means of precision molding forms, the pole is provided with the correct dimension which is necessary for a friction seal. For bare lead poles, this could have been achieved only by additional processing to remove surface irregularities.

During the encircling molding with synthetic plastic, that synthetic plastic shrinks firmly around the lead pole. Because of its tight interlocking with the grooves in the shaft of the pole, there is produced along this region an extended creepage path. Both this creepage path, and the shrinkage pressure under which the synthetic plastic mantle covering the pole shaft is placed, make it nearly impossible for the battery acid to penetrate this boundary region between lead and plastic during the life of the battery.

The true sealing region is therefore located between the pole coating and the lid. Being a plastic/plastic seal, it is problem-free, and in particular does not create any danger of corrosion.

The pole lead-through according to the invention also provides a "floating" suspension of the pole in the lid, which makes it possible to absorb possible working of the plate blocks in the direction of the axis of the pole.

The manufacturing advantage of the invention lies in its simple production, which is limited to a few trouble-free manufacturing steps. In particular, this seal eliminates a cumbersome casting process.

I claim:

1. An electric storage battery with poles which are led sealed through the housing lid, which is of synthetic plastic, wherein the pole shaft extends in axially displaceable manner through an opening in the housing lid and has a plurality of annular recesses axially spaced along the shaft, and the pole shaft is provided with a synthetic plastic mantle which has a plurality of internal annular ribs engaging and interlocking with the recesses in the pole shaft, and a plurality of axially spaced external annular sealing lips, the lips adjoining the inner wall of the opening in frictionally sealing manner, the mantle with its ribs and lips forming the only seal between pole shaft and housing lid.

2. The battery of claim 1, wherein
the opening in the housing lid has the form of a cylindrical tube 3. The battery of claim 1, wherein
the ribs and sealing lips are formed as integral parts of the mantle.

* * * * *